Patented May 6, 1952

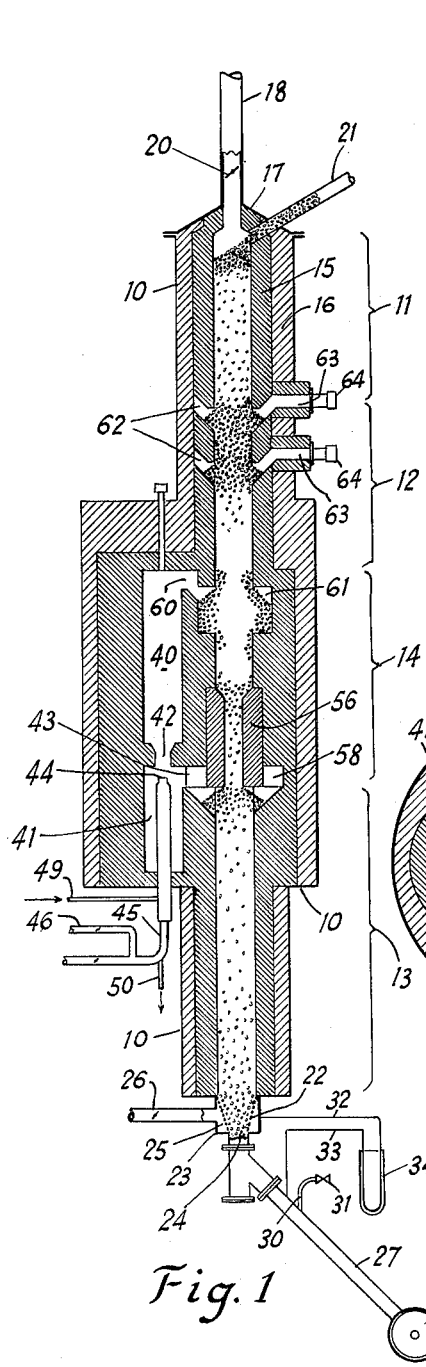
Fig. 1
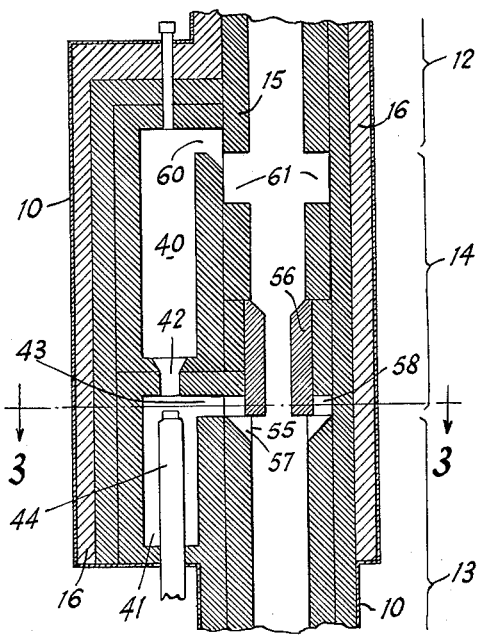
Fig. 2
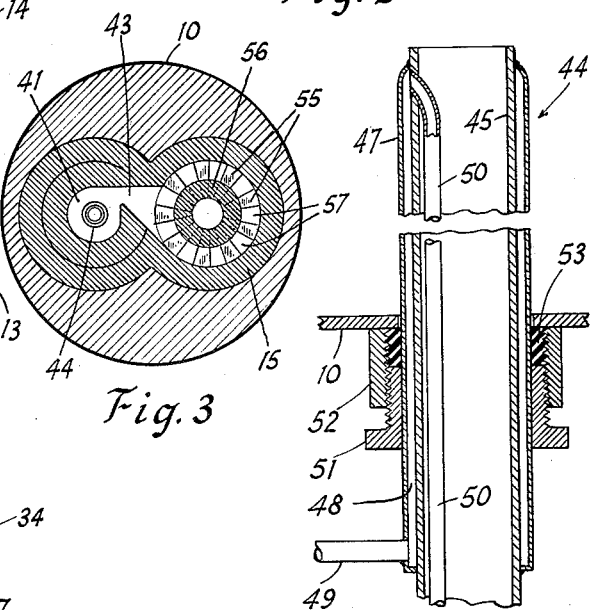
Fig. 3
Fig. 4
INVENTOR
Paul R. Grossman
BY
ATTORNEY

2,595,574

UNITED STATES PATENT OFFICE 2,595,574

SOLID MATERIAL HEATING METHOD AND APPARATUS

Paul R. Grossman, Irvington, N. J., assignor to The Babcock & Wilcox Company, New York, N. Y., a corporation of New Jersey Application May 22, 1948, Serial No. 28,586

6 Claims. (Cl. 263—19)

1

The present invention relates to the construction and operation of furnaces or kilns of the vertical shaft type for the high temperature treatment of a fluent mass or column of solid material.

In the commercial production of "burned" or vitrified materials, the raw material is subjected to high temperatures for a period of time sufficient to allow structural and/or chemical changes to take place in the material. Advantageously such a production process is performed on a continuous basis for heat economy and uniformity of finished product. The vitrification of ceramic particle materials is particularly advantageously performed on a continuous basis, and vertical shaft kilns have been used with good heat economy in the production of this type of product. Unfortunately, the uniformity of vitrified ceramic particles produced in known types of shaft kilns has not been satisfactory, when the kiln is operated under maximum heat economy conditions. At the vitrification temperature at least the surface of the individual bodies of ceramic material will be in a plastic condition, and the mass must be kept moving to prevent the formation of clusters of individual particles or bodies of the materials. A cluster will interfere with the movement of the material through the kiln and encourage the formation of other clusters. This condition becomes aggravated by the accumulative results of the cluster formation until the unit must be shut down. In any particular shaft kiln utilized in the vitrification of a particular material there is a critical range of operating temperatures within which it is possible to complete the vitrification of the solid material without forming clusters. This critical range lies within close limits of maximum and minimum temperatures. Thus the problem in operation of the kiln is to maintain the temperature of the solid materials within the limits of this close range and to attain a substantially uniform material temperature transversely of its direction of movement in the zone of highest material temperature. When such an objective is attained the uniformity of finished product will be satisfactory.

The general object of this invention is to provide an improved method of and apparatus for continuously heat treating a fluent mass of solid material which are particularly characterized by a substantially continuous movement of the solid material through a furnace or kiln of the vertical shaft type wherein the solid material is heated to a substantially uniform temperature transversely of its mass in the region of highest temperatures. A further and more specific object is

2 to provide a kiln of the character described which is constructed and arranged to cause a controlled heating of a moving mass of solid material under optimum time-temperature conditions to an elevated temperature, soaking the heated material at an elevated temperature to complete the desired structural and/or chemical changes therein, and subsequently cooling the heat treated material to a desirable handling temperature before its discharge from the kiln.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is an elevation view, partly in section, of a shaft kiln constructed in accordance with the present invention;

Fig. 2 is an enlarged section view of a portion of the apparatus shown in Fig. 1;

Fig. 3 is a cross-section taken on the line 3—3 of Fig. 2; and

Fig. 4 is an enlarged section view of another portion of the apparatus shown in Fig. 1.

While this invention in its broadest aspects is adapted for the continuous heat treatment of a wide range of fluent solid materials to a wide range of temperatures, it is particularly designed and especially useful for the continuous firing of a fluent mass of pellets formed of ceramic materials at a temperature of the order of 3000 F.

In the drawings I have illustrated my invention as embodied in a vertical shaft kiln for the burning or vitrification of ceramic refractory pellets intended for use as heat transfer material in fluid heating apparatus of the general type disclosed in the co-pending application of E. G. Bailey and R. M. Hardgrove, Serial No. 502,580, filed September 16, 1943, now Patent No. 2,447,306. Pellets of this character may be formed, for example, from a plastic mixture of fused alumina, raw kaolin clay, bentonite, water and a binder. The mix is formed into substantially spherical pellets having a diameter in the size range of ¼–1". The pellets are dried to remove the mechanical moisture therein and are fired at a temperature of the order of 3000 F. to obtain the strength, hardness, and resistance to thermal shock necessary for their described use. Other refractory compositions have been successfully fired at both higher and lower temperatures in the described kiln.

In the vitrification of the ceramic pellets described, the pellets are heated to the vitrification temperature, maintained at this temperature long enough for the necessary structural and chemical changes to take place, and then advantageously cooled to a convenient handling temperature. A shaft kiln is an efficient apparatus for performing this process, since the process can be continuous and the kiln acts as a countercurrent heat exchanger during both the heating and cooling cycles. Thus, after operating equilibrium has been reached, the heat recovered in cooling the pellets may be used in heating the material. Theoretically the additional heat added to the heating cycle may be limited to an amount necessary to compensate for radiation losses, to drive off the chemical water in the raw ceramic material, and to supply the heat necessary for any endothermic reactions which may take place in the particular material being treated. The most efficient heating conditions would thus be attained with a minimum temperature differential between the heat exchange materials, i. e. the solids and gases, at opposite ends of the kiln. However, a desirable uniformity of finished product cannot be attained under conditions of maximum theoretical heat efficiency.

For the necessary uniformity of product, the heating gases must be introduced into the kiln in sufficient volume to insure a minimum temperature differential between the entering heating gases and the pellets initially contacted by the gases. The volume of heating gases will be in excess of the theoretical gas quantity. Under these flow conditions the heating gases will substantially retain their entering temperature during the initial penetration of the moving pellet mass. Thus the pellet mass will attain a substantially uniform temperature transversely of its direction of movement in the region of initial heating gas contact. It will be further understood that the temperature of the heating gas upon entering the heating zone of the kiln will advantageously be essentially equal to the desired upper temperature limit of the pellets.

The vertical shaft kiln of the invention consists of a vertically elongated generally cylindrical gas-tight metal casing 10 enclosing a vertically elongated kiln which is functionally divided into four superposed zones or sections, namely; a pellet preheating section 11 and a heating section 12 in the upper portion, a cooling section 13 in the lower portion and an intermediate soaking section 14 therebetween. Each functional section of the kiln chamber is defined by a wall of suitable refractory material, such as an inner wall portion of high temperature fire brick 15 and a protective layer of insulating material 16 interposed between the casing 10 and the wall 15. While the heating and cooling sections 11, 12 and 13 are of substantially the same uniform diameter through their length, the intermediate soaking section 14 is of reduced cross-sectional area for a portion of its height, as hereinafter described. The upper end of the kiln is closed by a top 17 having a centrally located heating gas outlet connected with a stack 18 which is provided with a flow control damper 29. The pellets to be heat treated in the kiln are supplied to the upper end of the chamber section 11 from a hopper or receptacle (not shown) through a solid material inlet pipe 21 inserted in an opening in the top 17 of the kiln. Ordinarily the mass of pellets maintained in the pipe 21, and within the receptacle, will provide sufficient flow resistance to prevent any appreciable flow of gases therethrough to the atmosphere. The sealing effect of the pellet mass of course depends upon the heating gas pressure prevailing in the upper end portion of the section 11. If desired or necessary due to operating conditions a fluid flow seal, such as a star feeder or the like, may be inserted in the inlet pipe 21 to prevent an escape of heating gases therethrough.

The bottom of the kiln, at the lowermost portion of the chamber section 13, is defined by an inverted frusto-conical metal screen 22 surrounded by a reduced diameter cylindrical section 23 of the casing 10 which has a bottom discharge opening 24 spaced below the open lower end of the screen 22 to permit any solid material passing outwardly through the screen to reach the outlet 24 and be discharged. The screen 22 and section 23 cooperate to define an annular fluid inlet chamber 25 therebetween to which one or more valve controlled fluid supply ducts 26 are connected for the admission of a fluid under pressure. The discharge of solid material and pellets through the outlet 24 and a discharge pipe 27 is controlled by a feeder, such as a screw feeder 28, driven by a suitable variable speed drive mechanism (not shown). Thus, with the rate of solid material flow through the shaft kiln regulated by the screw 28, the dimensions of each section of the kiln will determine the relative period of time each ceramic pellet will be under treatment in each section of the kiln.

As hereinafter described, a measured portion of the combustion air utilized in generating the heating fluid used in the sections 11 and 12 is passed through the section 13 to cool the vitrified pellets. The air is preheated by its contact with the pellets and is withdrawn from the upper end portion of the section 13 to combine with additional air and fuel to burn and form a gaseous heating fluid. The flow path of the air used for pellet cooling purposes, and the heating fluid, results in an appreciable pressure differential between the top and the bottom of the kiln. While the column of pellets within the pipe 27, and the screw feeder 28, will tend to obstruct the flow of any gaseous fluid therethrough from the chamber 25, the pressure of the fluid within the chamber 25 will usually be sufficient to cause some fluid flow downwardly through the pellets to the atmosphere. Such a fluid flow is detrimental to the operation of the process, leading to an inaccuracy in the measured flow of air through the section 13, and is avoided by maintaining a balanced pressure in the pipe 27 by the use of a separate sealing fluid.

The sealing fluid, which may be compressed air, is delivered under a positive pressure, in excess of the fluid pressure occurring in the chamber 25, and is introduced into the pipe 27 through a pipe connection 30 which is located intermediate the outlet 24 and the feed screw 28. The sealing fluid pipe connection is provided with a valve 31 which may be manually or automatically positioned to maintain a zero differential fluid pressure between the spaced static pressure taps 32 and 33 opening respectively into the chamber 25 and into the pipe 27 between the outlet 24 and the connection 30. As shown in Fig. 1, the taps 32 and 33 are connected with a water manometer 34 so that the valve 31 may be adjusted for greater or lesser sealing fluid flow to maintain "no flow" conditions in the pipe 27 between the connection 30 and the outlet 24, as indicated by the pressure drop between taps 32 and 33.

The mass of pellets within the upper portion of the kiln is heated by direct contact heat exchange with the gaseous heating fluid generated by the combustion of a fuel within a furnace 40. The furnace is vertically elongated, of substantially uniform circular cross-section and is horizontally spaced from the intermediate soaking section 14. A subjacent chamber 41, coaxial with and substantially of the diameter of the furnace, is formed in the wall of the kiln and connected with the furnace 40 by a throat 42 of reduced cross-sectional area. The chamber 41 is provided with an inlet opening in its upper end for the tangential admission of preheated combustion air from the upper end of the kiln section 13 through a connecting passageway 43. As shown in Figs. 1 and 4, a liquid cooled gas burner nozzle 44 extends upwardly through the bottom of the chamber 41 along the vertical axis thereof to a position downwardly spaced from and in axial alignment with the throat 42.

The gas nozzle 44 is shown in Fig. 4, and consists of a cylindrical tube 45 which extends upwardly through the bottom of the chamber 41 to a position spaced below the throat 42. Beneath the chamber 41 the tube 45 is conveniently bent through a radius of 90° and connected with a source of gaseous fuel, such as a natural or artificial gas pipe line (not shown). A measured portion of the air for combustion is introduced into the tube 45 through a valved pipe 46 and combined with the fuel gas before the discharge of the mixture from the burner. The remainder of the combustion air is obtained through the passageway 43. Since this latter combustion air is preheated in passing through the section 13, it is necessary to provide means for cooling the burner nozzle 44. This is accomplished by enclosing the tip portion of the burner in a closely spaced, coaxially arranged metallic jacket 47 which is seal-welded at both ends to the tube 45. The annular chamber 48 formed between the tube 45 and the jacket 47 is supplied with a stream of water entering through a pipe 49 and escaping through a discharge pipe 50. The pipe 50 is connected with the the upper end of the chamber 48 and is longitudinally positioned closely adjacent a side of the tube 45 to project through the tube wall at the 90° bend. The burner, including the assembly of tube 45 and its jacket 47, is exteriorly provided with a tightly fitting flanged member 51 which engages a threaded flange 52 welded to the portion of the casing 10 beneath the chamber 41. An annular gasket 53, of suitable material, is interposed between the upper end of the member 51 and the adjacent portion of the casing 10, and when the member 51 is tightened to compress the gasket, the burner is rigidly positioned and a gas-tight joint provided between the jacket 47 and the kiln casing 10.

The preheated combustion air entering the chamber 41 through the passageway 43 is introduced in measured amounts into the bottom of the kiln through the duct 26. The air ascends through the kiln section 13 in direct contact countercurrent relationship with the mass of pellets, with the pellets being cooled to a convenient handling temperature while the air acquires a high degree of preheat. The upper end of the section 13 is provided with a flared enlargement in the confining refractory wall. The kiln enlargement is partially obstructed by a circumferential series of spaced piers 55 resting on the wall of the kiln section 13 and forming a support for a refractory tube member 56. The member 56 forms a reduced cross-sectional area for the movement of the pellet mass through the lower portion of the kiln section 14. Due to this restricted area substantially all of the combustion air ascending through the section 13 is deflected through a series of ports 57 between the piers 55 into an annular chamber 58 surrounding the lower end portion of the member 56 and opening into the passageway 43.

The air passing upwardly through the cooling section 13 entrains dust particles produced by abrasion of the pellets on the wall 15 of the kiln. The dust will tend to separate from the air within the chamber 41 due to the cyclonic motion transmitted thereto by its tangential entrance, with a substantial portion of the dust separating and settling to the bottom of the chamber 41. The preheated air mixes with the gaseous fuel and air leaving the burner 44 in passing through the throat 42 into the furnace where it burns with an intense flame to produce the gaseous heating fluid. The gaseous products of combustion leave the upper end of the furnace through a radially positioned port 60 which is in communication with an annular recess 61 in the wall of the kiln. The construction described insures a circumferential distribution of heating gas flow into the mass of pellets in directions generally normal to the direction of pellet movement.

It will be noted that the furnace 40 is positioned with its upper and lower end portions generally in communication with the opposite ends of the shaft kiln soaking section 14. Since the furnace is embedded in the refractory wall of the kiln which is surrounded by the insulating material 16, an appreciable portion of the heat released therein will be transmitted inwardly by conduction and convection through the intervening refractory wall to the pellets passing through the soaking section. This heat will tend to reduce the loss of heat from the pellets in leaving the heating section 12, so as to permit a continuation of the process of pellet vitrification during the period the pellets are moving through the soaking section.

With a flow of heating gases into the heating section of the kiln at a temperature substantially equal to the vitrification temperature of the ceramic material and at a flow rate adequate to insure substantially equivalent pellet temperatures transversely of pellet flow, the spent heating gases would leave the upper end of the kiln at a temperature considerably in excess of the entering pellet temperature. This not only lowers the thermal efficiency of the process, but also results in the destruction of a large portion of the entering pellets as a result of thermal shock, where the pellets frequently explode due to the high temperature differential between green pellets and the heating gas in contact therewith.

In accordance with my invention, I discharge a selected portion of the heating gas from a position intermediate the heating gas inlet and the upper end of the kiln. As a result, the temperature differential between the heating gas and the pellets will be extremely low at the gas inlet for desirably uniform high pellet temperatures, and the temperature differential between the remaining portion of the heating gas and the entering pellets will also be desirably low at the upper end of the kiln, to avoid pellet destruction from heat shock. A low temperature differential between the pellets and the heating gas causes a low rate of pellet temperature rise, which is desirable, at the opposite ends of the combined sections 11 and 12, as hereinbefore described. These heating conditions are attained with a high rate of pellet temperature rise intermediate the portion of the kiln between the heating gas entrance and exit. The described rates of pellet temperature rise are furthermore obtained in a comparatively short kiln length with an advantageously low pressure drop of fluid flow and low construction costs. Similar results might be attained in an uneconomically long shaft kiln without the discharge of some of the heating gases from a position intermediate the heating length of the kiln. Such a kiln would have a heating section length many times that shown in Fig. 1.

As shown in Fig. 1, a pair of horizontally disposed, vertically spaced annular chambers 62 are located in the lining 15 of the kiln at positions intermediate the heating gas inlet 61 and the top 17. The annular chambers open into the kiln and are each provided with an individual outlet 63 through the casing 10 in communication with the atmosphere. Each of the outlets is further provided with a flow control means, such as a valve or a refractory orifice mounted in a replaceable cap 64. Since the shaft kiln is operated under a positive pressure, the rate of by-pass gas flow outwardly through the outlets 63 can be adjusted by changing the area of orifice opening in the cap 64. As will be hereinafter apparent, the shaft kiln is operated under generally uniform material and fluid flow conditions, and once the rate of by-pass flow of heating gases is adjusted for optimum operating conditions the orifice opening in the caps 64 will remain fixed.

The shaft kiln of the present invention is advantageously operated under stabilized conditions of solid material and fluid flows. Since the heating gas flow introduced into the lower portion of the heating section 12 of the kiln will be in a volume in excess of the theoretical heating requirement, as previously described, the air required for combustion will also be in excess of that required for pellet cooling purposes in the cooling section 13. As a result, only the air necessary for cooling purposes will be passed through the section 13, and the remaining portion of the air is introduced through the pipe 46 into the burner nozzle 44. However, both portions of the combustion air are measured, so that the proper total amount of combustion air will be combined with the gaseous fuel in the furnace 40 to generate a heating fluid of the desired temperature and composition. The heating fluid enters the downwardly moving mass of pellets in generally radial directions from the annular chamber 61. As heretofore described the differential temperature of the pellets and the heating fluid in the region of initial contact is substantially zero and with sufficient gas velocities the heating fluid penetrates the mass so that the pellet temperature at the center is substantially equal to the pellet temperature around the circumference of the mass. The heating gas ascends through the interstices of the pellet mass with the pellets and the heating fluid having a gradually increasing temperature differential therebetween upwardly of the heating section.

The lowermost of the annular chambers 62 receives a portion of the heating gases passing upwardly through the kiln and directs the by-passed gas through the flow control orifice in the cap 64. The upper annular chamber 62 also receives a portion of the heating gases, which will be at a somewhat lower temperature, and discharges the by-passed gas to the atmosphere. In effect, the vertical spacing of the two annular chambers 62 provides a transition zone of pellet heating between the sections 12 and 11, where the gas flow through the interstices of the pellet mass is lowered in two steps, to reduce the abruptness of change in heat transfer rate between the adjacent heating and preheating section. This is advantageous in pellet heating, when the amount of by-passed gas may be equal to as much as 50 percent of the total volume of gas introduced at the lower end of the heating section. The number and vertically spaced relationship of the annular chambers 62 will depend primarily upon the amount of heating fluid by-passed. Under some conditions, only one annular by-pass chamber will be sufficient for the contemplated heating gas flows. Under other conditions it will be desirable to provide three or even more vertically spaced by-pass outlets for the partially spent gaseous heating fluid.

By way of example and not of limitation a shaft kiln of the type disclosed and of the illustrated general proportions, has been operated at a flow rate of 170 pounds of the described pellets per hour. The kiln sections 11, 12 and 13 were constructed with an internal diameter of approximately 9 inches, while the internal opening of the tubular member 56 was approximately 4½ inches. Under these conditions and at a substantially uniform rate of pellet movement, individual pellets remained in the kiln approximately 4 hours in moving through the successive sections of the kiln. The pellets attained a temperature of approximately 3000 F. with a heating gas temperature of 3000 F., and a gas flow rate of 290 pounds per hour. The lowermost annular by-pass chamber 62 withdrew by-passed heating gas at a temperature of approximately 2270 F., while the upper chamber 62 withdrew by-passed heating gas having a temperature of approximately 1700 F. The quantity of by-passed gaseous heating fluid totaled approximately 130 pounds per hour. With the pellets described the theoretical gas flow rate would be of the order of 170 pounds per hour and while the thermal efficiency of the unit would be high, without the use of heating gas by-passes, the finished product would not be uniform, and thus would be unsatisfactory for the pellet end use.

It will be noted that the present invention provides for a flow of heating gases into a gaspervious mass of fluent solid material under temperature and flow rate conditions causing the solid material to attain a substantially uniform temperature transversely of the moving mass in the region of highest material temperatures. A portion of the heating gases are withdrawn from the heating zone of the shaft kiln after giving up a part of their sensible heat to the fluent solid material. The heating gases are produced by the combustion of a fuel in a furnace with a measured part of the combustion air preheated in cooling the finished product within the lower portion of the kiln. The heating gases not only heat the mass of solid material by direct contact heat exchange in the upper portion of the kiln, but also heat the material in an intermediate portion of the kiln by conduction and convection. Since the preheated air contains dust entrained in its passage through the finished material, a substantial portion of particularly the larger particles of dust are advantageously removed before mixing with the fuel and other air for combustion purposes. This reduces the tendency for dust to accumulate in the apparatus and to plug or restrict the heating gas flow passages.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. The method of continuously heating a moving mass of fluent solid material at a normal operating rate and to a high temperature which comprises introducing a gas heated to a high temperature into said moving mass in a heating zone in a weight 50 to 100% in excess of the theoretical heat requirements to heat the mass of material to a substantially uniform temperature transversely of the moving mass and substantially equal to the temperature of the entering heating gas, passing said heating gas in countercurrent flow through the interstices of said moving mass, discharging a portion of said heating gas generally equal in weight to said excess of heating gas from said heating zone to atmosphere, and utilizing the remaining portion of said heating gas to preheat said moving mass.

2. The method of continuously heating a downwardly moving mass of fluent solid material at a normal operating rate and to a high temperature in a vertically elongated heating zone which comprises generating a high temperature heating fluid by fuel combustion, heating said mass of material at a low rate of temperature rise in the lower portion of said heating zone by direct contact countercurrent heat transfer relationship with a large weight of said high temperature heating gas having a heat content approximately 50 to 100% in excess of the theoretical heat requirement to heat the mass of fluent solid material and at a temperature substantially equal to the desired fluent solid material temperature, heating said mass at a high rate of temperature rise in an intermediate portion of said heating zone, discharging a portion of the partially cooled heating gas from the lower region of the intermediate portion of said zone to atmosphere, and reducing the high rate of temperature rise in said mass in the intermediate portion of said heating zone by discharging to atmosphere a further portion of the further partially cooled heating gas from the upper region of said intermediate zone.

3. The process of vitrifying ceramic particle materials which comprises passing a fluent mass of said ceramic particle materials downwardly at a generally uniform rate through heating, soaking and cooling zones, heating the material within said heating zone by direct contact countercurrent heat transfer relationship with a heating fluid having a heat content approximately 50 to 100% in excess of the theoretical heat requirements and being at a temperature substantially equal to the desired ceramic particle temperature, withdrawing and discharging to atmosphere a substantial portion of said heating fluid from the heating zone after said fluid has given up a part of its sensible heat to said ceramic material, utilizing the remainder of said heating fluid to preheat the ceramic material in the remaining portion of said heating zone, soaking said ceramic material at a high temperature within said soaking zone substantially out of direct contact with any fluid to complete vitrification of said material, cooling said material by direct contact countercurrent relationship with a measured stream of cooling air having a weight generally equal to the air weight necessary to combine with fuel to generate the heating fluid theoretically necessary to heat the ceramic particle materials in said heating zone, and combining the heated cooling air from said material cooling zone with a measured mixture of gaseous fuel and air in a separate combustion zone to generate said heating fluid.

4. Apparatus for the heat treatment of a fluent mass of solid material comprising walls defining an elongated shaft kiln having an upper inlet and a lower outlet for said fluent solid material, means for causing a continuous movement of said material through said kiln, a combustion chamber enclosed within the wall of an intermediate portion of said kiln and in communication with the interior of said kiln at an upper intermediate position, a subjacent chamber in communication with said combustion chamber and with said kiln at a lower intermediate position, a burner arranged to deliver a mixture of fuel and combustion air to said combustion chamber, means for preheating a portion of the combustion air by heat exchange in cooling said heat treated fluent solid material, and means for removing at least the larger particles of dust from said preheated combustion air in said subjacent chamber.

5. Apparatus for the heat treatment of a fluent mass of solid material comprising walls defining an elongated shaft kiln having an upper inlet and a lower outlet for said fluent solid material, means for causing a continuous movement of said material through said kiln, a combustion chamber enclosed within the wall of an intermediate portion of said kiln and in communication with the interior of said kiln at an upper intermediate position, a subjacent chamber in communication with said combustion chamber and with said kiln at a lower intermediate position, a burner arranged to deliver a mixture of fuel and combustion air to said combustion chamber, said burner having an annular jacket radially spaced from and enclosing the tip of said burner and having an exterior water inlet connection at the bottom of said jacket and a water outlet pipe connected into the upper end of said jacket, said water outlet pipe extending longitudinally of the interior of said burner to an exterior position, and means for introducing another portion of the air for combustion into said subjacent chamber in a preheated condition and in a tangential direction adjacent the discharge end of said burner.

6. Apparatus for the heat treatment of a fluent mass of solid material comprising walls defining a vertically elongated kiln having a solid material inlet and a heating gas outlet at its upper end and a solid material outlet at its lower end, means for causing a downward movement of said solid material as a continuous column through said kiln, said kiln having a soaking zone intermediate its height including a portion of reduced cross-section, a vertically elongated furnace chamber embedded in the wall of said kiln and having its upper end opening to said kiln at the upper end of said soaking zone, a lower vertically elongated chamber embedded in the wall of said kiln and in communication with said furnace through a connecting throat, said lower chamber having a tangentially arranged inlet in the upper end thereof for the admission of preheated air from the lower portion of said kiln, a fuel burner arranged to discharge a mixture of fluid fuel and another portion of the combustion air axially into the lower end of the throat between said lower chamber and furnace chamber, and means for withdrawing and discharging to atmosphere a portion of the heating gases from said kiln chamber at a location intermediate the upper end opening of said furnace chamber into said kiln and said kiln heating gas outlet.

PAUL R. GROSSMAN.

REFERENCES CITED

The following references are of record in the file of this patent:

UNITED STATES PATENTS

| Number | Name | Date |
|---|---|---|
| 1,175,247 | Doherty | Mar. 14, 1916 |
| 1,798,802 | Niles | Mar. 31, 1931 |
| 2,115,586 | McFarland | Apr. 26, 1938 |
| 2,199,384 | Azbe | May 7, 1940 |
| 2,370,281 | Azbe | Feb. 27, 1945 |